Patented Sept. 17, 1946

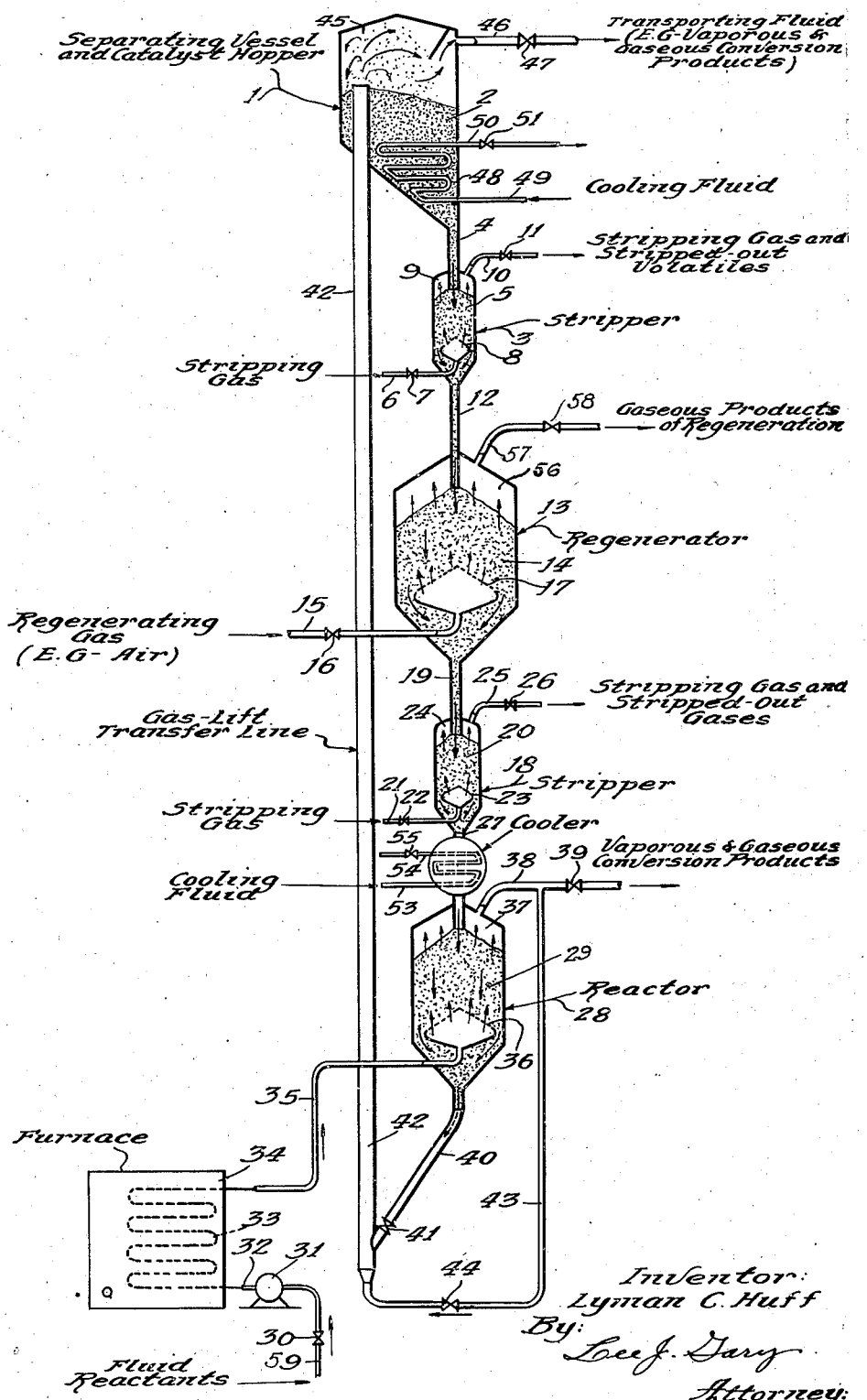

2,407,700

UNITED STATES PATENT OFFICE 2,407,700

PROCESS FOR THE CONVERSION OF FLUID REACTANTS

Lyman C. Huff, Chicago, Ill., assignor to Universal Oil Products Company, Chicago, Ill., a corporation of Delaware Application June 26, 1944, Serial No. 542,210

5 Claims. (Cl. 196—52)

This is a continuation-in-part of my co-pending application Serial Number 530,645, filed April 12, 1944.

The invention is directed to an improved method and means for effecting the conversion of fluid reactants in the presence of a mass of subdivided solid contact material which becomes contaminated with deleterious products of the conversion reaction and is regenerated by removing the deleterious contaminants. The process is of the type in which the conversion step and the regenerating step are conducted continuously and simultaneously in separate confined reaction and regenerating zones between and through which the subdivided solid contact material is continuously circulated.

The process and apparatus are particularly advantageous as applied to hydrocarbon conversion reactions, such as catalytic cracking, reforming, dehydrogenation, dehydrocyclization or aromatization and the like, in which the contact material comprises catalyst which promotes the desired hydrocarbon conversion reaction. The invention is further more particularly directed to an improved operation of the type in which the mass of subdivided solid catalyst or contact material in the reaction and regenerating zones is maintained in the form of a relatively compact bed of downwardly moving solid particles.

Preferably, the catalyst or contact material employed is in the form of small substantially spherical particles. Their size, whether spherical or of other regular or irregular shape, is sufficient that the particles will not compact excessively to give a high pressure drop when beds of substantial depth are employed in the reaction and regenerating zones. It is a further requirement that the solid particles be sufficiently small to facilitate their transportation by gas-lift in a part of the circuit through which they flow between the reaction and regenerating vessels.

The ability of the solid particles to be transported by gas-lift can be calculated by known formulae, taking into account their average density and the density and velocity of the transporting fluid. To be readily transported by gas-lift and to avoid excessive compaction in the beds, I have found that spherical particles of cracking catalyst, for example, consisting predominantly of silica and one or more metal oxides, such as alumina, zirconia, magnesia and the like, are preferably from 2 to 4 mm. average diameter. The presence in the beds of substantial quantities of excessively fine particles of a powdery or dusty nature should be avoided so that they will not excessively fill the voids between the larger particles and give an excessive pressure drop for the reactants and regenerating gases passing through the beds. For this reason, the particles charged to the system are preferably of substantially uniform or well graded size and any excessive quantity of fines produced by attrition of the larger particles within the system is preferably removed from the system and replaced by larger particles. To avoid excessive attrition, the particles should have good structural strength. The use of substantially spherical particles will also greatly assist in avoiding excessive attrition. One suitable method of preparing synthetic catalysts which may be advantageously used in the present process is disclosed in application Serial Number 516,392 of Glenn M. Webb and Reno W. Moehl, filed December 31, 1943.

A special feature of the invention resides in the manner and means whereby continuous circulation of the solid particles of catalyst or contact material is effected through the system. Their circulation is effected, in part, by gravitational descent from a separating zone and hopper mounted above the reaction and regenerating vessels serially through these vessels, and, in part, by discharging the solid particles from the lower vessel of the series into a gas-lift transfer line wherein they are commingled with transporting fluid and carried upwardly by the latter into the aforesaid separating zone and hopper to complete the circuit. The solid particles pass downwardly from the hopper through the contacting vessels in the form of a continuous and uninterrupted relatively compact column. By eliminating intermediate feeding devices and the like which would interrupt the continuity of the column, the height of the latter imposes a substantial pressure on the solid particles at the bottom of the column which is materially greater than the gas or vapor pressure prevailing above the column in the separating zone and hopper. In the gas-lift transfer line through which the solid particles are transported from the lower contacting vessel of the series back to the separating zone and hopper, the particles are suspended in the transporting fluid so that there is little or no accumulative weight of solid particles in the height of the gas-lift transfer line and they flow upwardly with the transporting fluid to the relatively low pressure zone prevailing in the separating vessel and hopper.

As another special feature of the invention I prefer to employ vaporous and/or gaseous products discharged from the reaction zone as the transporting fluid for the solid particles in the gas-lift transfer line. As applied to the conversion of normally liquid products, such as, for example, the catalytic cracking of hydrocarbon oil, this use of outgoing vaporous conversion products as transporting fluid is advantageous in that sufficient pressure can be developed in the vaporous stream of out-going conversion products to permit its use as transporting fluid by pumping the charging oil being supplied to the reactor in liquid state, which is materially less expensive than employing a gas compressor or the like to develop sufficient pressure in the stream of transporting fluid, as would be necessary when employing incoming or outgoing regenerating gas or gas from an external source as the transporting fluid.

Although the features of the invention are advantageously applicable to the conversion or treatment of fluid reactants generally in the presence of a mass of subdivided solid contact material, catalyst or reagent, they are, as previously mentioned, particularly advantageous as applied to the catalytic conversion of fluid hydrocarbons and, for the sake of being more explicit in illustrating the features and advantages of the invention, the succeeding description will be directed principally to an operation in which hydrocarbon oil is catalytically cracked.

The accompanying diagrammatic drawing is an elevational view, shown principally in section, of one specific form of apparatus embodying the features of the invention and in which the improved process provided by the invention may be successfully conducted.

Referring now to the drawing and to the flow through the system illustrated, the catalyst particles are collected, as will be later described, within the separating vessel and hopper 1 in the form of a relatively compact bed 2. The catalyst particles collected in bed 2 will have accumulated deleterious heavy combustible products of the cracking or hydrocarbon conversion reaction being conducted within the system. All or a major portion of these combustible deposits are to be burned from the catalyst particles in the regenerating step, as will be later described. In addition, the bed 2 contains occluded and adsorbed transporting gas in which the solid particles were transported to vessel 1. When, as in the case illustrated, outgoing vaporous and gaseous products of the hydrocarbon conversion reaction are employed as the transporting fluid, the occluded and adsorbed vapors and gases are of a valuble nature and if not removed and recovered would be lost by burning in the succeeding regenerating step. Furthermore, their combustion in the regenerator would develop additional heat in this step, which is ordinarily undesirable. Excessive heating of the catalyst will destroy or permanently impair its activity.

In view of the inclusion of valuble light hydrocarbons in the bed 2 of solid particles accumulated in vessel 1, a stripping vessel 3 is interposed between this hopper and the regenerator wherein occluded and adsorbed volatile hydrocarbons are substantially removed from the solid particles before they enter the regenerator. The solid particles pass downwardly from the lower, hopper-like portion of vessel 1 through conduit 4 into the upper portion of stripper 3. Here they pass downwardly through another relatively compact bed 5 of the solid particles maintained in this zone countercurrent to a stream of suitable stripping gas, such as steam, for example, which is supplied to the lower portion of the stripper through line 6 and valve 7 and is distributed substantially uniformly over the cross-sectional area of bed 5 by a suitable distributing member 8 provided within the lower portion of the stripper. The stripped-out volatiles and stripping gas are discharged from the upper extremity of bed 5 into the space 9 provided thereabove within vessel 5 and are thence discharged through line 10 and valve 11 to suitable separating and recovery equipment, not illustrated. This separating and recovery equipment may conveniently comprise the same fractionating equipment to which vaporous and gaseous hydrocarbon conversion products of the process are supplied, as will be later described.

The stripped catalyst particles pass downwardly about member 8 into the conical lower section of stripper 3 and are thence directed through conduit 12 into regenerator 13 wherein they move downward through the relatively compact bed 14 maintained in this zone. Air or other suitable oxygen-containing gas is supplied to the regenerator through line 15 and valve 16 and is distributed substantially uniformly over the horizontal cross-section of bed 14 by means of a suitable distributing member 17 from which it passes upwardly into bed 14. Combustible contaminants are burned from the solid catalyst particles by their contact with the oxidizing gas passing countercurrent thereto through bed 14. Resulting gaseous products of combustion are discharged from the upper extremity of bed 14 into a space provided thereabove within the regenerator, from which they are directed through line 57 and valve 58, preferably to suitable heat recovery equipment of any desired form not illustrated.

A substantial portion of the heat developed by burning the combustible contaminants in the regenerating step is stored in the solid catalyst particles discharged from the lower portion of this zone. The stream or column of catalyst particles passing from the regenerator will also contain entrained and adsorbed gases comprising a part of the regenerating gas employed and resulting combustion gases. To prevent these entrained and adsorbed gases from entering the reaction zone the stream of catalyst being supplied from the regenerator to the reactor preferably is substantially stripped of such material and, in the case illustrated, a stripper 18 similar in form to stripper 3 above mentioned is interposed between the regenerator and the reactor. The hot regenerated catalyst passes about the distributing member 17 in the lower portion of the regenerator into the substantially conical bottom section of this vessel and is thence directed through conduit 19 into and through the relatively compact bed 20 of catalyst particles maintained within stripper 18. Steam or other suitable stripping gas is supplied to the lower portion of stripper 18 through line 21 and valve 22 to be distributed to bed 14 by member 23 disposed within the lower portion of the stripping vessel and to pass upwardly from member 23 through bed 20 countercurrent to the descending solid particles. Resulting stripping gas and stripped-out gases are discharged from the upper portion of bed 20 into the space 23 provided thereabove within the stripper and are thence discharged through line 25 and valve 26, preferably to the same heat recovery equipment to which combustion gases are discharged, as previously mentioned, from regenerator 13.

The substantially stripped catalyst particles pass downwardly about distributing member 23 into the cone-like lower section of stripper 18 and are thence discharged through conduit 27 into reactor 28 to pass downwardly through the relatively compact bed 29 of catalyst particles maintained within this zone.

Fluid reactants to be converted, which, in the case illustrated, comprise hydrocarbon oil to be cracked, are supplied in liquid state through line 59 and valve 30 to pump 31 wherefrom they are fed under the pressure imposed by pump 31 through line 32 to heating coil 33 disposed within furnace 34. Here the oil is substantially vaporized and heated to or near the reaction temperature desired and the heated vapors are directed from coil 33 through line 35 into a suitable distributing member 36 disposed within the lower portion of reactor 28, wherefrom they pass upwardly into bed 29 and are converted by countercurrent contact with the catalyst particles passing through the bed. Resulting vaporous and gaseous conversion products are discharged from the upper extremity of bed 29 into the space 37 provided thereabove within the reactor, from which they are discharged through line 38 and may pass, in part, through valve 39 in this line to suitable fractionating and recovery equipment of any desired conventional form, not illustrated.

The temperature of the catalyst is reduced somewhat in passing through bed 29 in the reactor by giving up heat to the endothermic hydrocarbon conversion reaction which it promotes and the catalyst particles accumulate deleterious combustible contaminants comprising heavy products of the hydrocarbon conversion reaction. To restore its activity and heat content the catalyst is returned from the reactor to the regenerator; thus setting up a cyclic flow of catalyst through the system.

The partially cooled and contaminated catalyst passes downwardly about distributing member 36 in the lower portion of the reactor into the cone-like lower section of this vessel and is thence directed through conduit 40 and through an adjustable orifice or flow-regulating valve 41 provided in conduit 40 adjacent its lower end into a substantially straight upwardly extending gas-lift transfer line 42. In line 42 the catalyst particles are commingled with and suspended in a stream of transporting fluid which, in the case illustrated, comprises all or a portion of the vaporous and gaseous conversion products discharged from reactor 28. The conversion products to be used as transporting fluid are directed from line 38 under the vapor or gas pressure prevailing within the reactor above bed 29 through line 43 and valve 44 into transfer line 42.

The vapor or gas pressure maintained in vessel 1 above the bed 2 is materially less than the static pressure developed in the relatively compact column of catalyst particles above the adjustable orifice or flow-regulating valve 41 in line 40 and the vapor or gas pressure maintained in space 37 within the reactor is sufficiently greater than that prevailing in the space above bed 2 in vessel 1 to overcome the pressure drop in the stream of transporting gas as it passes through line 38, line 43 and gas-lift transfer line 42 so that the transporting gas and the catalyst particles suspended therein flow upwardly through the gas-lift transfer line 42 into the disengaging space 45 provided within vessel 1 above bed 2.

The velocity of the transporting gas is materially reduced in space 45 of the separating vessel 1 as compared with its velocity in line 42 so that all or a substantial portion of the catalyst particles separate by gravity from the transporting gas in vessel 1 and collect in the lower portion of this zone to form the bed 2. The transporting gas, which, as previously mentioned, comprises vaporous and gaseous hydrocarbon conversion products, in the case illustrated, is directed from the upper portion of vessel 1 through line 46 and valve 47 to suitable fractionating and recovery equipment of any desired conventional form which is not pertinent to the present invention and is therefore not illustrated. When desired, and as previously indicated, that quantity of the vaporous and gaseous conversion products discharged from reactor 28 which may not be required as transporting fluid in transfer line 42 may be directed through valve 39 in line 38 to the same fractionating and recovery equipment to which the vapors and gases utilized as transporting fluid are directed from vessel 1.

Adjustment of the orifice or opening through the flow-regulating valve 41 in conduit 40 regulates the rate at which catalyst particles are circulated through the system, and this rate may be adjusted to suit requirements so as to give the desired residence time for the catalyst in the reaction and regenerating zones and give the desired catalyst-oil ratio in the reactor and the desired ratio of catalyst to the regenerating gas in the regenerator. The term "catalyst-oil ratio" as here used refers to the pounds of catalyst entering the reaction zone per hour, per pound of oil supplied to this zone. The term "catalyst regenerating gas ratio" as here used refers to the pounds of catalyst entering the regenerator per hour, per pound of regenerating gas supplied to this zone.

By regulating the rate at which catalyst is circulated through the system it is possible to obtain a close approach between the average temperature of the catalyst passing through the regenerator and the average temperature of the catalyst passing through the reactor. When this results in a regenerator temperature which is relatively close to the reaction temperature desired it is unnecessary to supply additional heat to or abstract additional heat from the catalyst as it circulates through the system. However, as applied to reactions such as catalytic cracking in an operation producing commercially practical yields of the desired products, the quantity of combustible deposits accumulated by the catalyst in the reaction step and burned therefrom in the regenerating step is usually more than that required to store in the catalyst all of the heat necessary for conducting the hydrocarbon conversion reaction. I therefore provide for abstracting excess heat from the catalyst, when desired. This may be done, as in the case illustrated, either after the catalyst leaves the reactor and before it enters the regenerator or after the catalyst leaves the regenerator and before it enters the reactor or, in part, by both.

In the case illustrated, a cooling coil 48 is provided in the lower portion of vessel 1 through which a suitable cooling fluid, such as steam, water, oil or the like is passed via lines 49 and 50 in an amount controlled by valve 51 to abstract the desired quantity of heat from the catalyst passing through bed 2. Alternatively, a cooler of any suitable form may be interposed in conduit 40, transfer line 42 or in conduits 4 or 12 or in stripper 3, for the purpose of controllably reducing the temperature of the catalyst being supplied to the regenerator from the reactor and thus reducing the average temperature obtained in the regenerator.

The drawing also illustrates the provision of a suitable cooler 52 in conduit 27 and provision for passing suitable cooling fluid such as steam, water, oil or the like through this cooler in indirect contact and heat transfer relation with the catalyst passing from the regenerator to the reactor. Cooling fluid is supplied to cooler 52 through line 53 and is discharged therefrom through line 54 in amounts regulated by valve 55. Alternatively, a suitable cooler may be located in conduit 19 or in the stripping vessel 18 for controllably reducing the temperature of the catalyst supplied to the reactor from the regenerator, in case the temperature prevailing in the latter zone is considerably higher than the temperature at which it is desired to conduct the conversion reaction.

I claim:

1. The process of converting fluid reactants in the presence of a mass of subdivided solid contact material which comprises directing the solid contact material downwardly in series from an uppermost separating zone through separate confined reaction and regenerating zones, maintaining a relatively compact bed of the solid particles in each of said zones and maintaining the downwardly moving solid particles in the form of a continuous relatively compact column extending uninterruptedly through and between said zones, the static pressure at the bottom of said column being substantially greater than the pressure in said uppermost separating zone, contacting the bed of solid particles in the regenerating zone with regenerating gas to remove therefrom deleterious contaminants accumulated in the reaction zone, contacting the bed of solid particles in the reaction zone with the fluid reactants to be converted and effecting their conversion therein, maintaining the pressure of the vaporous conversion products in said reaction zone greater than the pressure in said separating zone, separately removing fluid products of regeneration and fluid products of the conversion reaction from the respective regenerating and reaction zones and preventing any substantial commingling thereof, discharging the subdivided solid particles at said static pressure from the bottom of said continuous column into and suspending the same in a stream of transporting fluid comprising a portion of said vaporous conversion products, directing the suspended particles solely by the gas-lift action of said transporting fluid upwardly into said separating zone, the pressure of said vaporous conversion products in said reaction zone being sufficiently greater than the pressure in said separating zone to overcome the pressure drop of said transporting fluid during its flow from said reaction zone to said separating zone, separating said transporting fluid from at least a major portion of the subdivided solid particles and directing the latter downwardly as aforesaid through the contacting zones.

2. A process such as defined in claim 1, wherein said fluid reactants to be converted are supplied to the reaction zone by pumping them while in liquid state and wherein fluid conversion products are discharged in essentially vaporous state and at superatmospheric pressure from the reaction zone and utilized at least in part as said transporting fluid.

3. A process such as defined in claim 1, wherein said conversion reaction comprises the catalytic cracking of normally liquid hydrocarbons and the subdivided solid contact material comprises cracking catalyst.

4. The process of endothermically converting normally liquid hydrocarbons in essentially vaporous state and in the presence of subdivided solid catalyst which promotes the conversion reaction comprising imposing a superatmospheric pressure on the hydrocarbons in liquid state and substantially heating the same to effect their substantial vaporization, supplying the heated vapors to a confined reaction zone and into contact with a relatively compact bed of downwardly moving catalyst particles maintained therein, therein effecting their conversion and discharging resulting vaporous conversion products while still under superatmospheric pressure from the upper portion of the reaction zone, separately discharging catalyst particles from the lower portion of said reaction zone and suspending the same in transporting vapors comprising a portion of said vaporous conversion products, directing the resulting suspension solely by the gas-lift action of said portion of vaporous conversion products into a separating zone of substantially reduced pressure disposed at a substantial elevation above the reaction zone, said superatmospheric pressure of said vaporous conversion products being sufficiently greater than said reduced pressure in said separating zone to overcome the pressure drop of the transporting vapors during their flow from said reaction zone to said separating zone, separating catalyst particles from the transporting vapors and collecting the catalyst particles in the form of a relatively compact bed, directing catalyst particles from the last named bed downwardly into a separate confined regenerating zone, therein maintaining another relatively compact bed of catalyst particles and burning therefrom combustible contaminants accumulated in the reaction zone by passing oxidizing gas upwardly through the bed, discharging resultant gaseous products of combustion from the upper portion of the regenerating zone, separately discharging the resultant regenerated catalyst particles from the lower portion of the regenerating zone, directing the same downwardly into said reaction zone for further use therein in promoting the hydrocarbon conversion reaction, maintaining the catalyst particles in the form of a relatively compact continuously column extending uninterruptedly from a point in said separating zone to a point below the reaction zone, the static pressure at the bottom of said column being substantially greater than the pressure in said separating zone, and effecting the discharge of catalyst particles from the lower portion of the reaction zone into said transporting vapors under the weight of said continuous column.

5. A conversion process which comprises passing subdivided solid contact material vertically downward in the form of a relatively compact continuous column extending uninterruptedly from an uppermost separating zone through and between a plurality of superimposed contacting zones, the static pressure at the bottom of said column being substantially greater than the pressure in said uppermost separating zone, contacting a hydrocarbon reactant under conversion conditions with the solid material in one of the last-named zones while maintaining the pressure of the vaporous conversion products therein substantially greater than the pressure in said separating zone, regenerating the solid material in another of the contacting zones by passing an oxygen-containing gas therethrough, discharging solid particles from the bottom of said continuous column into a stream of transporting fluid comprising vaporous conversion products of said hydrocarbon reactant under the weight of the column and directing the same upwardly into said separating zone solely by the gas-lift action of the transporting fluid, the pressure of said vaporous conversion products in the contacting zone being sufficiently greater than the pressure in said separating zone to overcome the pressure drop of said transporting fluid during its flow from the contacting zone to said separating zone, separating solid particles from transporting fluid in the separating zone, and depositing the separated particles onto the top of said column in the separating zone to pass downwardly through the contacting zones as aforesaid.

LYMAN C. HUFF.